US009665951B2

United States Patent
Rasmusson et al.

(10) Patent No.: US 9,665,951 B2
(45) Date of Patent: May 30, 2017

(54) UNIFIED COMPRESSION/DECOMPRESSION GRAPHICS ARCHITECTURE

(75) Inventors: Jim Rasmusson, Vellinge (SE); Tomas Akenine-Möller, Lund (SE); Petrik Clarberg, Lund (SE); Jon Hasselgren, Bunkeflostrand (SE); Jacob Munkberg, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1511 days.

(21) Appl. No.: 12/127,462

(22) Filed: May 27, 2008

(65) Prior Publication Data

US 2009/0160857 A1 Jun. 25, 2009

Related U.S. Application Data

(60) Provisional application No. 61/015,361, filed on Dec. 20, 2007.

(51) Int. Cl.
*G06F 12/02* (2006.01)
*G06T 11/00* (2006.01)
(Continued)

(52) U.S. Cl.
CPC .............. *G06T 11/001* (2013.01); *G06T 1/60* (2013.01); *G06T 9/00* (2013.01); *G06T 15/04* (2013.01); *G06T 2210/08* (2013.01)

(58) Field of Classification Search
CPC ......... G06T 1/60; G06T 9/00; G06T 2210/08; G06T 15/04; G06T 11/001
See application file for complete search history.

(56) References Cited

U.S. PATENT DOCUMENTS 4,594,673 A * 6/1986 Holly ............................. 345/421
4,725,831 A * 2/1988 Coleman ........................ 345/441
(Continued)

FOREIGN PATENT DOCUMENTS

EP 0829820 A2 3/1998

OTHER PUBLICATIONS

Torborg et al., Talisman: Commodity Realtime 3D Graphics for the PC, Dec. 1996, ACM, p. 353-363.*
(Continued)

*Primary Examiner* — Robert Craddock
(74) *Attorney, Agent, or Firm* — Coats and Bennett, PLLC

(57) ABSTRACT

A unified compression/decompression architecture is disclosed for reducing memory bandwidth requirements in 3D graphics processing applications. The techniques described erase several distinctions between a texture (compressed once, and decompressed many times), and buffers (compressed and decompressed repeatedly during rendering of an image). An exemplary method for processing graphics data according to one or more embodiments of the invention thus begins with the updating of one or more tiles of a first image array, which are then compressed, using a real-time buffer compression algorithm, to obtain compressed image array tiles. The compressed image array tiles are stored for subsequent use as a texture. During real-time rendering of a second image array, the compressed image array tiles are retrieved and decompressed using a decompression algorithm corresponding to the buffer compression algorithm. The decompressed image array tiles are then applied as a texture to one or more primitives in the second image array.

17 Claims, 5 Drawing Sheets

(51) Int. Cl.
  *G06T 9/00* (2006.01)
  *G06T 1/60* (2006.01)
  *G06T 15/04* (2011.01)

(56) References Cited

U.S. PATENT DOCUMENTS

| | | | | |
|---|---|---|---|---|
| 4,924,415 | A * | 5/1990 | Winser | 345/422 |
| 5,784,064 | A * | 7/1998 | Penna et al. | 345/422 |
| 6,009,210 | A * | 12/1999 | Kang | 382/276 |
| 6,157,743 | A * | 12/2000 | Goris et al. | 382/233 |
| 6,339,428 | B1 | 1/2002 | Fowler et al. | |
| 6,906,720 | B2 | 6/2005 | Emberling et al. | |
| 6,959,110 | B1 * | 10/2005 | Danskin | H04N 19/12 345/555 |
| 2001/0019331 | A1 * | 9/2001 | Nielsen et al. | 345/542 |
| 2002/0190997 | A1 * | 12/2002 | Barcena et al. | 345/582 |
| 2008/0225049 | A1 * | 9/2008 | Fowler et al. | 345/422 |

OTHER PUBLICATIONS

Hasselgren, J. et al. "Efficient Depth Buffer Compression." Graphics Hardware, Sep. 2006.

Rassmusson, J. et al. "Exact and Error-bounded Approximate Color Buffer Compression and Decompression." Graphics Hardware, Aug. 2007.

Strom, J. et al. "iPACKMAN: High-Quality, Low-Complexity Texture Compression for Mobile Phones." Graphics Hardware, 2005, pp. 63-70.

Krause, Philipp Klaus. "Texture Compression." Nov. 24, 2007. Internet article available at: http://www.colecovision.eu/graphics/texture_compression.pdf.

Rasmusson, J. et al. U.S. Appl. No. 11/953,339, filed Dec. 10, 2007 and entitled "Frame Buffer Compression and Decompression Method for Graphics Rendering."

Alexandersson et al., "Compressing Dynamically Generated Textures on the GPU," International Conference on Computer Graphics and Interactive Techniques, 2006, p. 1.

* cited by examiner

UNIFIED COMPRESSION/DECOMPRESSION GRAPHICS ARCHITECTURE

RELATED APPLICATION

This application claims priority under 35 U.S.C. §119(e) from U.S. Provisional Patent Application Ser. No. 61/015,361, which was filed on 20 Dec. 2007 and is entitled "Unified Compression/Decompression Graphics Architecture."

TECHNICAL FIELD

The present invention generally relates to the processing of graphics data, and particularly relates to methods and apparatus for rendering and compressing an image for subsequent use as texture data in image rendering.

BACKGROUND

Three-dimensional (3D) graphics processing systems typically utilize several memory buffers during the rendering process, including, for example, color buffers and depth buffers (often called z-buffers). These buffers often are stored in random-access memory (RAM) external to the graphics processing unit (GPU), which may have relatively small cache memories on chip. Because the buffered data may be retrieved and re-written several times during the rendering process, the available memory bandwidth (the capacity for writing data to memory and reading data from memory) must often be quite high, especially to support real-time graphics processing applications such as real-time games. On a desktop personal computer, the available memory bandwidth might be very high, perhaps several gigabytes per second. In a mobile phone, on the other hand, only several hundred megabytes per second of data transfer might be available.

Even with a high available memory bandwidth, the performance of a GPU for some applications might nonetheless be constrained by the memory bandwidth. Reducing the amount of data retrieved from and written to the external RAM is thus generally advantageous. The advantages of reducing memory transactions are particularly pronounced in mobile platforms, such as a mobile telephone, since the increased clock rates and wider data buses necessary to support very high memory bandwidths also result in increased power consumption, draining batteries more quickly. By reducing the memory bandwidth, lower clock rates and/or narrower data buses may be used, thereby reducing the power consumption.

To reduce the burden on the memory system, several different types of compression algorithms are used in conventional graphics processing systems. In a typical GPU, compression and decompression algorithms may be employed at several different places. For instance, textures may be compressed with a texture compression algorithm, such as the Ericsson Texture Compression (ETC) algorithm, which is described in "iPACKMAN: High-Quality, Low-Complexity Texture Compression for Mobile Phones" (Jacob Ström & Tomas Akenine-Möller, *Graphics Hardware*, pp. 63-70, 2005) and which is part of the OpenGL ES standard—the main open standard for graphics on mobile devices. As those skilled in the art will appreciate, texture compression algorithms are almost always lossy. ETC in particular compresses standard 24-bit-per-pixel (RGB888) textures down to a fixed rate of 4 bits per pixel. Those skilled in the art will also appreciate that texture compression may often be performed offline as a pre-process, so that the graphics hardware performs only texture decompression of pre-compressed texture files. In such a system, then, access to pre-compressed textures is typically read-only.

The various buffers used in 3D graphics processing, such as the color buffer, depth buffer, or stencil buffer, may also be compressed, using various algorithms. One approach to color buffer compression is described in U.S. patent application Ser. No. 11/953,339, titled "Frame Buffer Compression and Decompression Method for Graphics Rendering," and filed Dec. 10, 2007, by Rasmusson et al., the entire contents of which are incorporated herein by reference. Several depth buffer compression algorithms are described in "Efficient Depth Buffer Compression" (Jon Hasselgren & Tomas Akenine-Möller, *Graphics Hardware*, September 2006). Buffer compression and decompression are very different from texture compression and decompression, since the contents of the buffer may be accessed, modified, and stored repeatedly during the rendering process. Compression is performed before shuffling data from an internal cache out to external memory. If the data can be compressed, it is sent over the bus in compressed form, thereby saving memory bandwidth. Correspondingly, when data is retrieved from the external memory, it is sent in compressed form over the bus, decompressed, and put into the internal cache. Those skilled in the art will appreciate that this process occurs at least once each time a triangle is being rendered, and may thus occur numerous times during the rendering of a single image.

Buffer compression algorithms are often exact (i.e., non-lossy), but there are exceptions to this, such as the color buffer compression algorithm described in the Rasmusson application cited above. Buffer compression algorithms are often symmetric, so that the compression and decompression operations take about the same amount of time to perform. This is important, since buffer compression is used during rendering, and a given portion of the buffer may be decompressed and compressed several times if rendering operations are performed on that portion more than once. Texture compression algorithms, on the other hand, are typically asymmetric—compressing a texture usually requires much more processing power than decompressing the resulting file. As a result, textures are conventionally pre-compressed (offline) for later use by the GPU.

In recent graphics applications, it has become more common to use a final rendered image as a texture when rendering a later image. As an example, consider the use of so-called cube maps. A cube map stores a 360-degree image of the scene as seen from some point in the center of the scene. The cube-map may be used to generate simulated reflections during real-time rendering. For a static scene, the cube map can be created as a pre-process, and stored in compressed form as a conventional texture. However, if the scene is dynamic (i.e., with moving objects, such as moving clouds), the cube map generally must be recreated for each of several displayed frames by rendering into a buffer.

In existing graphics architectures, buffer compression and texture compression operations are conceptually and physically separated. This separation makes it harder to reduce the bandwidth. For example, there are two known approaches for conventional hardware to handle the dynamic cube map rendering problem described above. The first approach is to disable compression of the cube map buffer during rendering of the cube map image. The cube map image may then be stored as an uncompressed image for subsequent use as a texture in a later rendering pass. However, this approach uses a great deal of memory bandwidth, since buffer compression is not used when rendering the cube map and texture compression is not exploited when retrieving the stored cube map image for use as a texture in the later rendering pass. A second approach is to enable buffer compression during the rendering of the cube map image, and, when the cube map image is completed, to retrieve the compressed cube map image, decompress it, and store the decompressed cube map image in memory for later use as an uncompressed texture. This approach may make slightly more effective use of memory bandwidth, since buffer compression is used during the cube map image rendering, but this approach includes an extra decompression process (of the entire cube map) and does not provide any benefits from compression at all when the cube map is used as a texture in the later rendering pass.

SUMMARY

Disclosed herein is a novel approach to reducing memory bandwidth requirements in 3-D graphics processing applications by introducing a unified compression/decompression architecture for a graphics processor. Using this architecture, data compression may be used for graphics processing operations where compression previously has not been possible. The techniques described herein erase several distinctions between texture data (compressed once, and decompressed many times by the graphics hardware), and buffer data (compressed and decompressed repeatedly during rendering of an image). This approach enables a considerable reduction of bandwidth in operations where compression advantages previously were impossible.

Although more generally applicable, these methods and apparatus are particularly useful in real-time, polygon-based, 3D rendering applications. Those skilled in the art will appreciate that the methods and apparatus disclosed herein may be applied to reduce the memory bandwidth requirements for a given graphics application, to facilitate more advanced graphics processing, or both. Those skilled in the art will also appreciate that the techniques disclosed herein may provide particular advantages in a battery-powered portable device, such as a mobile phone, where higher memory bandwidth requirements generally result in increased energy consumption and shorter battery life.

An exemplary method for processing graphics data according to one or more embodiments of the invention begins with the updating of one or more tiles of a first image array, which are then compressed, using a real-time buffer compression algorithm, to obtain compressed image array tiles. The compressed image array tiles are stored for subsequent use as a texture. During real-time rendering of a second image array, the compressed image array tiles are retrieved and decompressed using a decompression algorithm corresponding to the buffer compression algorithm. The decompressed image array tiles are then applied as a texture to one or more polygons in the second image array.

In some embodiments, the compressed image array tiles may be associated with a compression algorithm identifier corresponding to the real-time buffer compression algorithm. This compression algorithm identifier may be analyzed when the compressed image array tiles are later retrieved for use as a texture map, to identify the correct decompression algorithm to be used.

Apparatus for processing graphics data according to one or more of the above methods, as well as variations of those methods, are also disclosed herein. In particular, several embodiments of a graphics processor, comprising a graphics rendering engine, a compression unit, and a programmable controller, are disclosed. Some embodiments of the graphics processor include one or more unified cache memories, in which compressed or decompressed texture data or image array tiles, e.g., from a color buffer, depth buffer, stencil buffer, or other buffers, may be stored during processing. Of course, the present invention is not limited to the above features and advantages. Those skilled in the art will recognize additional features and advantages upon reading the following detailed description, and upon viewing the accompanying drawings.

DETAILED DESCRIPTION

As noted above, buffer compression and texture compression operations are conceptually and physically separated in conventional graphics processing architectures, making it difficult to reduce the memory bandwidth in certain applications. One such application is the cube map scenario described above, in which a rendered image is later used as a texture in rendering a second image. To minimize the memory bandwidth requirements, a graphics processor would optimally use buffer compression while rendering the cube map image, avoid any extra, intermediate decompression processes, and still benefit from compression when accessing the cube map image for use as a texture in the later image rendering. This is just one example of an application where the unified compression/decompression graphics architecture disclosed herein is useful.

Figure 1:
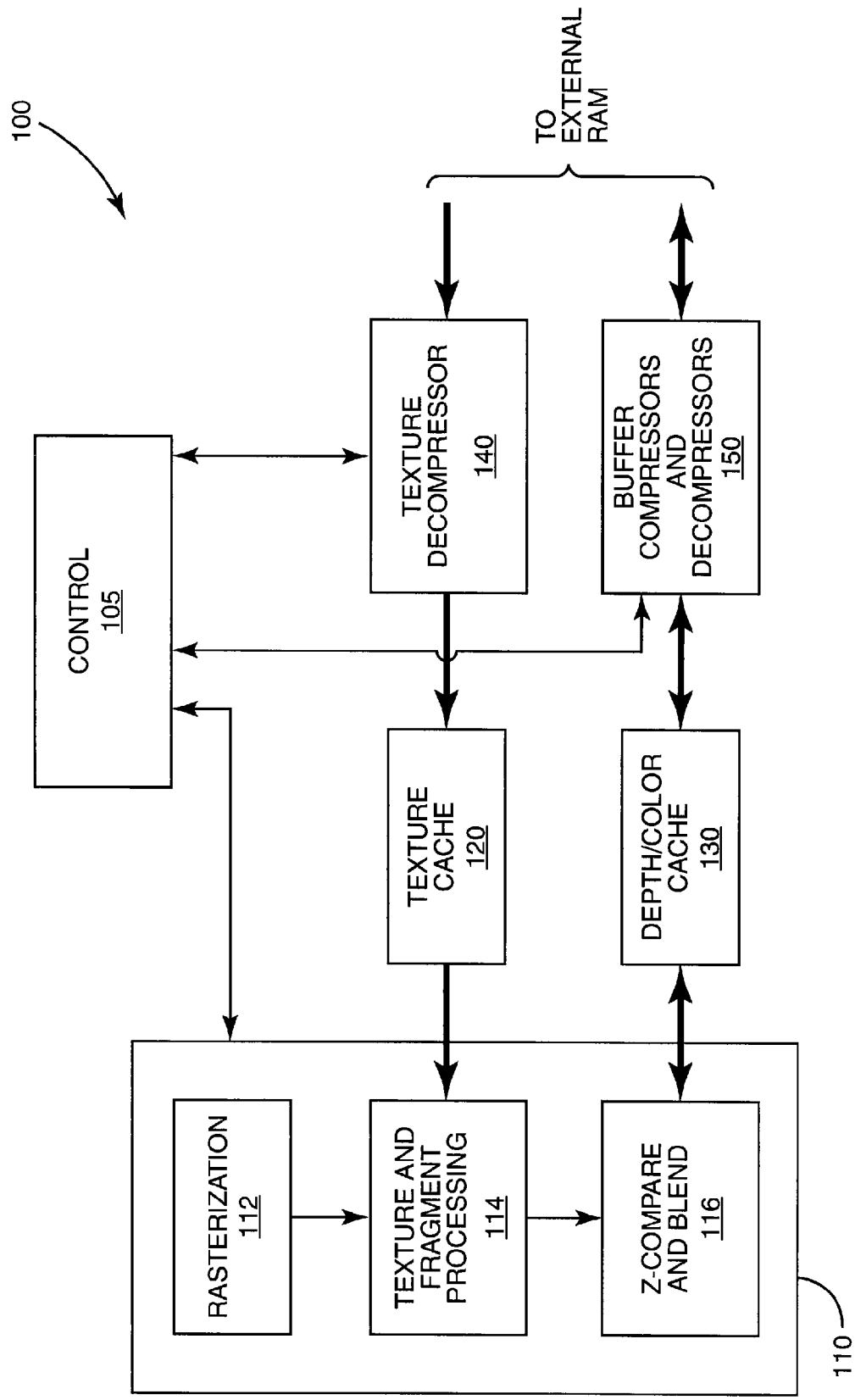
FIG. 1 illustrates a conventional graphics processing architecture.

An overview of a conventional rasterization-based graphics processor 100 is shown in FIG. 1. FIG. 1 includes a control unit 105, which controls the various functions of the graphics processor, a graphics rendering engine 110, caches 120 and 130, and compression units 140 and 150.

Graphics rendering engine 110 includes the per-pixel processing of the image rendering process. The pixel-processing pipeline in graphics rendering engine 110 begins with rasterization (often called triangle traversal), at rasterizer 112, where the pixels (or samples) inside the triangle or other primitive (polygon) being rendered are found. Each sample/pixel is then processed by a fragment program in the texture & fragment processing unit 114. The texture & fragment processing unit 114 can also access textures through a texture cache 120. After the texture and fragment processing, a depth test (z-compare) is performed at the z-compare & blend unit 116. If this test passes for a given pixel, values for the pixel are written to one or more of several different buffers (color, depth, stencil etc). In FIG. 1, only depth and color (Z/C) buffers are illustrated, but similar processes may be applied to any number of buffers of any type. Color and depth buffers are accessed through a depth/color cache 130.

As is well known to those skilled in the art, graphics processing operations such as the rendering operations described above are typically performed on small portions of an image frame. The image frame may be divided into small blocks, or tiles; a typical tile may comprise, for example, 4×4 or 8×8 pixels. A graphics processing unit may retrieve one or a few of these tiles at a time from a color buffer, depth buffer, etc., for processing. Typically, the tiles are stored in compressed form in a Random-Access Memory (RAM) external to the graphics processing unit. Thus, these tiles are decompressed, using buffer compression unit 150, when read from external RAM into depth/color cache 130 for processing by graphics rendering engine 110, and compressed, using buffer compression unit 150, for storage in external RAM when processing of those tiles is at least temporarily completed.

Textures accessed by texture & fragment processor 114 are also typically stored in external RAM in compressed form, according to one of several well-known texture compression algorithms. These textures are decompressed by texture decompressor 140 and supplied to the graphics rendering engine 110 through the texture cache 120. As with buffer data, texture data is also generally processed in tiles or blocks. Those skilled in the art will appreciate, however, that texture decompression in FIG. 1 is a one-way process. In contrast, tiles of the color buffer and other buffers related to the image rendering process may be repeatedly compressed and decompressed, and shuffled back-and-forth between depth/color cache 130 and external RAM. As discussed above, various lossy and lossless algorithms may be used. Buffer compressor & decompressor unit 150 may thus be configured to compress and decompress data according to several algorithms.

Those skilled in the art will appreciate that several elements of the processor not directly related to the present invention have been omitted for clarity. For instance, the geometry portion of the processing architecture has been left out, as it is unchanged by the inventive techniques disclosed here. Further, only a subset of the graphics pipeline of graphics rendering engine 110 has been described here. Normally, there may also be alpha testing and many more features at work as well.

Figure 2:
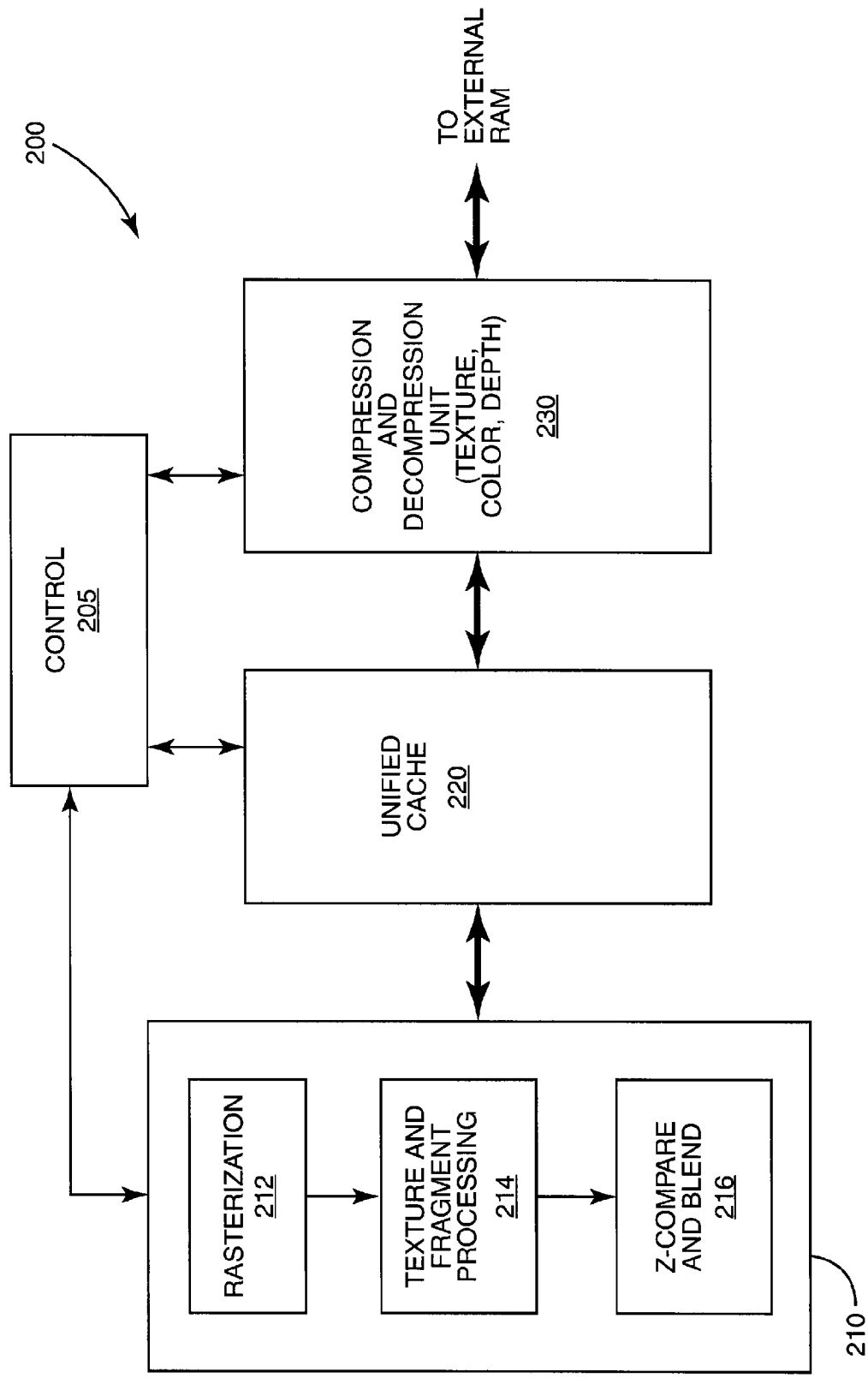
FIG. 2 is a block diagram illustrating an exemplary graphics processor according to one embodiment of the invention.

As can be readily seen from FIG. 1, the texture decompression and buffer compression and decompression processes flow through physically separate units. This separation limits the ability of the conventional graphics processing architecture to minimize memory bandwidth usage in applications where rendered images/buffers are later used as textures. The present invention, in contrast, combines the concepts of buffers and textures into a unified concept. Textures and buffers may each be regarded simply as an array, and may each be processed in a single, unified pipeline. An overview of one embodiment of a graphics processor utilizing this approach is illustrated in FIG. 2.

Graphics processor 200 includes a controller 205, which controls a graphics rendering engine 210 and a compression unit 230. (The term "compression unit" is used herein to refer to a logical and/or physical processing unit configured to carry out one or more compression algorithms or decompression algorithms, or both.) Graphics rendering engine 210 includes a rasterizer 212, texture & fragment processor 214, and z-compare & blend unit 216, each of which has similar functions to its counterpart in FIG. 1. Here, however, the texture cache and the buffer (Z/C) cache have been unified into a single cache, a unified array cache 220, which is electrically connected between the graphics rendering engine 210 and the compression unit 230. Furthermore, a single unit is configured to perform all of the required compression and decompression processes; compression unit 230 thus provides a unified point for compression and decompression operations.

One advantage of this configuration is that the texture & fragment processing unit 214 can access stored textures without regard to whether the texture is a conventional pre-compressed texture file or a buffer that was rendered in a previous image rendering operation. When texture data is retrieved from external RAM, it is decompressed, using the appropriate decompression algorithm, by the compression unit 230. If the retrieved texture data was previously compressed with a conventional texture compression algorithm, then compression unit 230 decompresses the texture data with the corresponding texture decompression algorithm, and supplies the decompressed texture data to the graphics rendering engine 210, via the unified cache 220. If, on the other hand, the retrieved texture is a previously rendered buffer, it must have been compressed with a buffer compression algorithm during its creation. In this case, the compression unit 230 decompresses the texture data with the corresponding buffer decompression algorithm, and again supplies the decompressed texture data to the graphics rendering engine 210 through the unified cache 220. In short, graphics processor 200 treats textures and buffers as arrays—each array may be associated with a particular compression and decompression algorithm, which is applied when accessing that particular array.

Those skilled in the art will appreciate that there are several ways to implement the graphics processing architecture described above. One approach is to have a programmable compression unit 230, loaded with different programs depending on the current needs. Another is to have a pool of fixed-function compressors and decompressors, each of which has access to the external RAM and to the unified cache 220. The individual compressors and decompressors may be exact (lossless) or approximate (lossy); some embodiments may include one or more of each.

The unified cache 220 may in some embodiments comprise a single cache. In other embodiments, the cache may be split into, for example, a texture cache, and color and depth caches as well. Those skilled in the art will appreciate that a particular portion of the cache may be allocated to textures, for example, without regards to whether the texture is a pre-processed texture or is the output of a previous rendering operation. Compression unit 230 performs the appropriate processing for each.

Those skilled in the art will also appreciate that the allocation of cache memory to different kinds of data may be either fixed (or configurable on a per-application basis) or allocated using a dynamic allocation strategy controlled by an arbiter block or advanced resource manager in controller 205. Controller 205 may then assign more cache memory to the processing unit that needs it the most at the moment, whether it is for texture, depth, color, or other processing.

Figure 3:
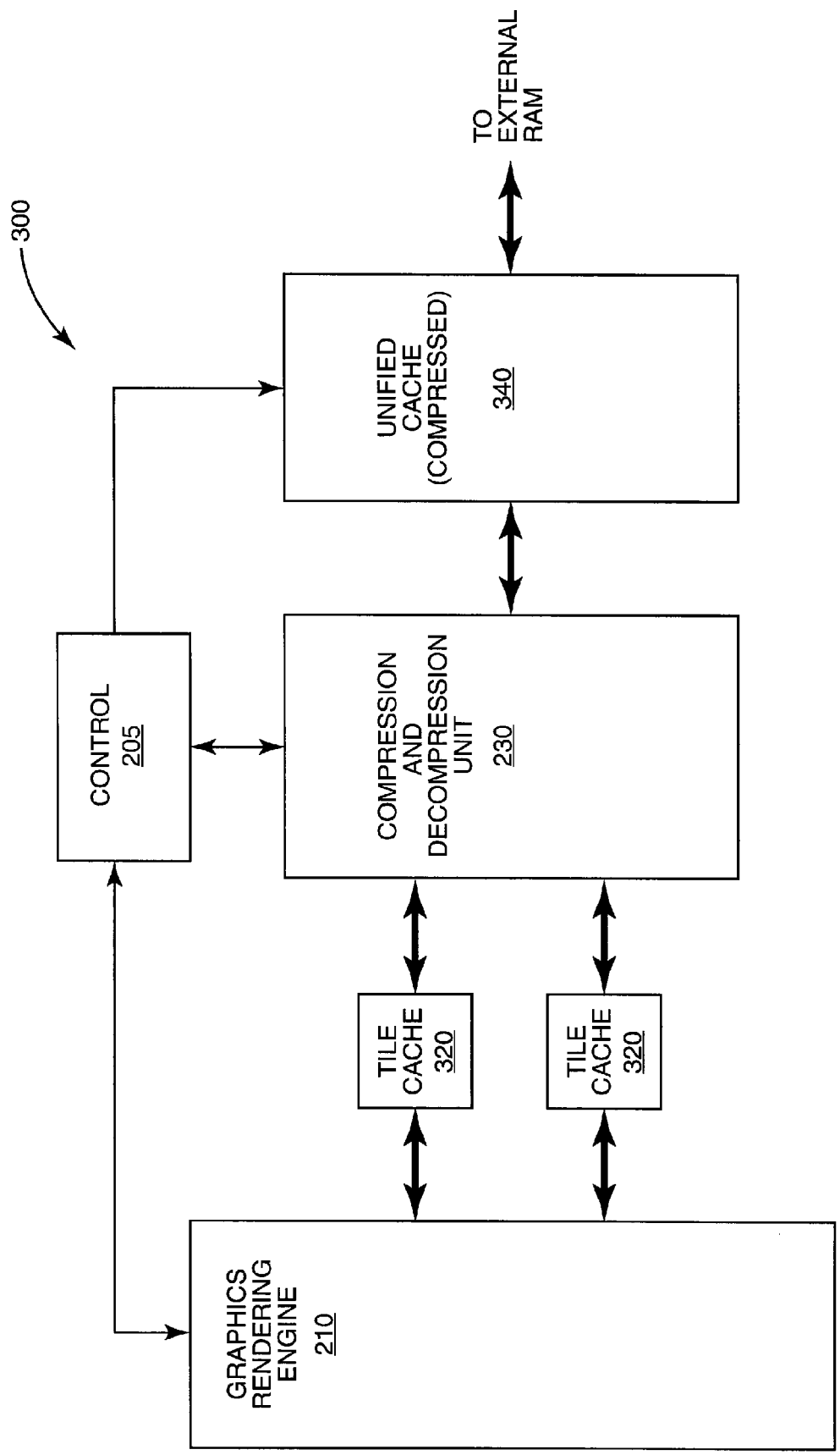
FIG. 3 is a block diagram illustrating an exemplary graphics processor according to another embodiment of the invention.

An alternative embodiment of a graphics processing unit, where a unified cache is electrically connected between the compression unit 230 and an external RAM interface, is illustrated in FIG. 3. In FIG. 3, graphics processor 300 comprises a graphics rendering engine 210 and compression unit 230, each of which may be identical to its counterpart in FIG. 2. Because the unified cache 340 is "after" the compression unit 230, i.e., between the compression unit 230 and external RAM, the cached data is compressed. Thus, the cache may be smaller than the unified cache 220 of FIG. 2. However, for maximum efficiency, one or more small uncompressed caches 320 may be used between the compression unit 230 and the graphics rendering engine 210, to avoid the need for decompression and compression operations just to read or write a single or a few pixels. These small, uncompressed caches may be sized to handle one, or a few, blocks or tiles. Each memory accessing unit in graphics rendering engine 210 may have its own tile cache 320, as shown in FIG. 3, or a single small tile cache may be shared among multiple units.

The use of a compressed unified cache 340, as pictured in FIG. 3, may require an extra bookkeeping mechanism that keeps track of how much each cache entry is compressed. For example, the unified compressed cache may be used for fixed bit-rate compressed textures, and at the same time, also used for compressed color buffer tiles with several different bit-rates depending on compression method (e.g., compression rates 1:1, 1:2 and 1:4). Example sizes for the small tile cache(s) 320 and the unified compressed cache 340 are a few hundred bytes and a few tens of kilobytes respectively.

Figure 4:
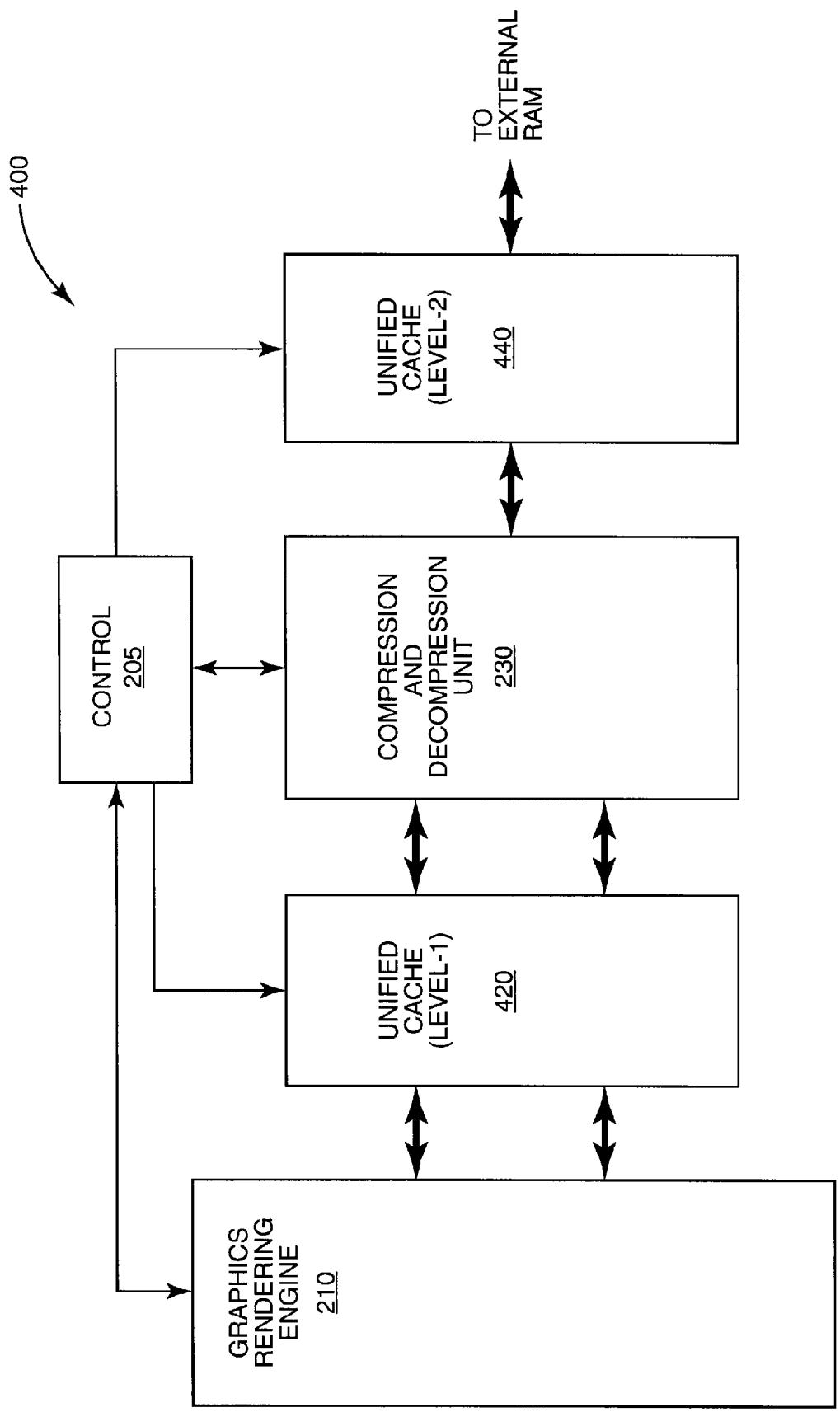
FIG. 4 is a block diagram illustrating another exemplary graphics processor.

Yet another embodiment is to introduce a cache hierarchy with a smaller level-1 cache 420 and a larger level-2 cache 440, as illustrated in FIG. 4. The level-1 cache 420 stores uncompressed data, while the level-2 cache 440 contains compressed data. In this embodiment, the level-2 cache may have much more capacity, and may be designed with more silicon-efficient technology (e.g., slower transistors, lower associativity, etc), resulting in slower speed than the level-1 cache 420. Example sizes for the level-1 and level-2 caches 420 and 440 may be a few tens of kilobytes and a few hundred kilobytes respectively.

There are several advantages to the architectures and techniques described above. One is that a graphics processor can render all or part of an image to a buffer using buffer compression and decompression algorithms, and then immediately use the buffer as a compressed texture. Since the buffer was created using buffer compression, it is decompressed with the corresponding buffer decompression algorithm even though it is to be used as a texture. This approach can provide substantial bandwidth savings. Assume, for instance, that a color buffer compression algorithm achieves about 50% compression. With a conventional graphics processor, buffer compression must be disabled for the rendering of an image for later use as a texture. Furthermore, when data from that buffer is later retrieved for use as a texture, the conventional graphics processor is again unable to use compression. A slightly more efficient conventional graphics processor implementation might use compression during color buffer rendering, resulting in 50% bandwidth compression during the rendering operation. However, the resulting color buffer data in this case must be decompressed before it is later used as a texture. This intermediate decompression operation costs bandwidth proportional to the size of the buffer (50% for reading, and 100% for writing it back to texture memory). In any event, this slightly more efficient conventional graphics processor is still unable to use compression for the buffer when it retrieves it for use as a texture.

In contrast, under the same assumptions, the graphics processors disclosed herein benefit from 50% compression and decompression during rendering of the color buffer. The extra, intermediate decompression stage is avoided altogether. Furthermore, the rendered color buffer data is saved in compressed form, so that when it is later retrieved for use as a texture, the graphics processor enjoys a 50% reduction in memory bandwidth usage for the texture access as well.

Additional advantages resulting from the use of a unified cache for both buffers and textures will be apparent to those skilled in the art. For example, if a particular operation involves only rendering to the depth buffer, then the entire cache may be used for depth buffer tiles, instead of having part of it reserved for textures, and other parts for color and stencil buffer data.

Figure 5:
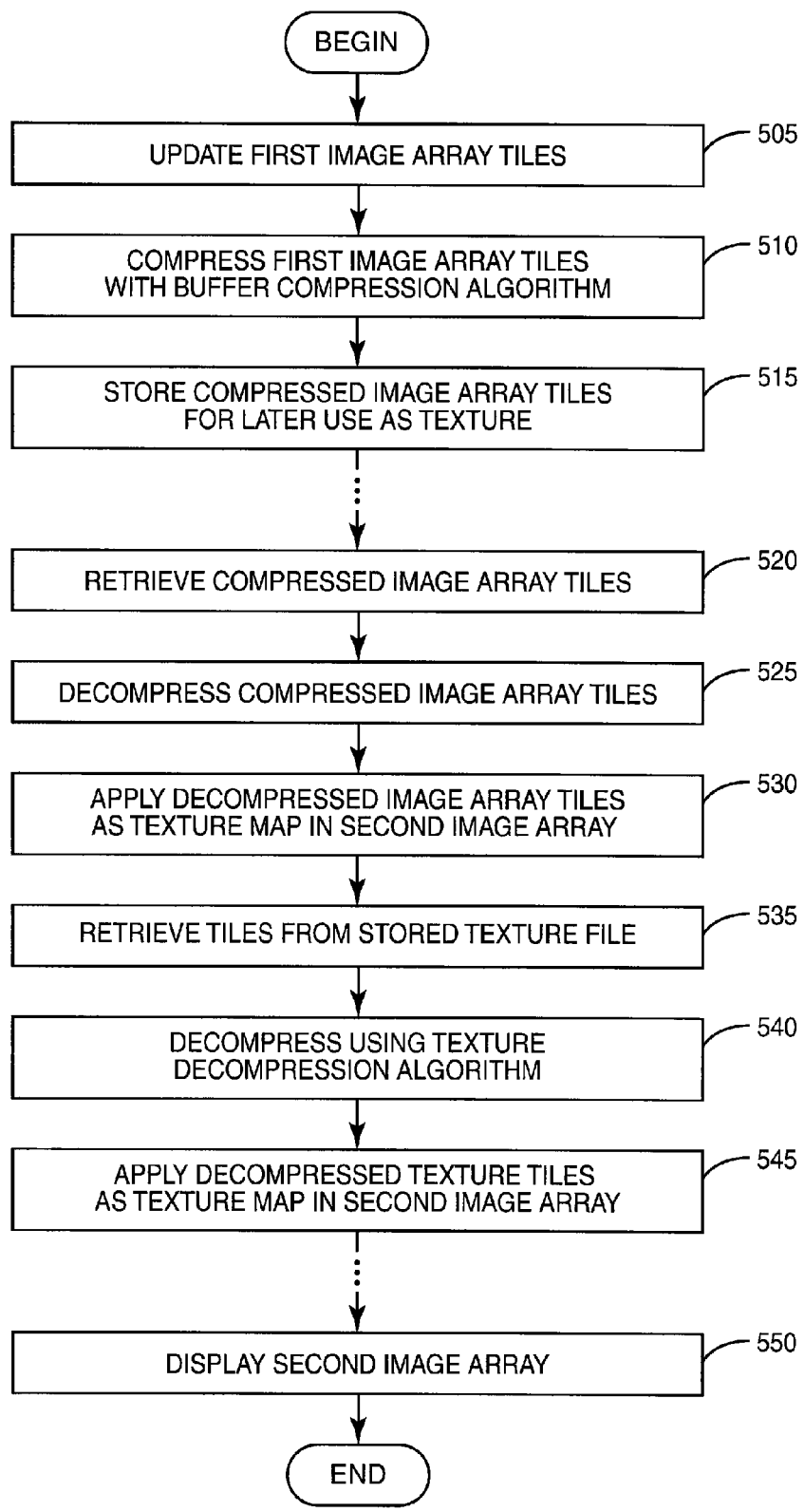
FIG. 5 is a logic flow diagram illustrating an exemplary method for processing 3D graphics data according to the invention.

With the above range of graphics processor implementations in mind, an exemplary method for processing graphics data is illustrated in FIG. 5. The method begins with the updating of one or more tiles of a first image array with graphics, as shown at block 505. Those skilled in the art will understand that "updating" may mean accessing pixel data and modifying it, in some cases, or writing new data to one or more pixels in others. The updating may be part of any of a number of other conventional graphics processes, such as rasterization, color computation, depth processing, shading, etc. In some cases, the first image array may be a cube map image, as discussed above. In such a case, the updating of the one or more tiles of this first image array may comprise the same pixel processing used for rendering an image for display, even though the first image array might never be displayed as a completed image frame.

Those skilled in the art will appreciate that a graphics processing unit draws an image in several steps. Typically, images are constructed from "primitives," often triangles or other polygons, each of which may cover all or a portion of several tiles. Thus, a graphics processing unit may draw several hundred thousands of triangles to construct an image; these are often drawn overlapping or covering one another. In the process of rendering an image, a given tile, or a single pixel on a tile, may be drawn over several times. As is well known to those skilled in the art, a "Z-buffer" or depth buffer may be used to keep track of which triangle is on top. Thus, drawing a single triangle may result in the updating of several tiles, in several buffers. Further, rendering an entire image may include the drawing of hundreds of thousands of triangles; many tiles may be repeatedly updated.

Referring once again to FIG. 5, the rendering of the first image array thus uses at least one buffer, such as a color buffer, during the rendering. Tiles retrieved from this buffer, here referred to as first image array tiles, are compressed and decompressed during the rendering operation, using one or more conventional buffer compression algorithms and the corresponding decompression algorithms, as shown at block 510. In some embodiments, multiple real-time buffer compression algorithms may be available, in which case one of the available buffer compression algorithms is selected. This selection might be based, for example, on whether the current rendering operation is for later use as a texture or only a rendering of a frame for immediate viewing.

In this case, the updated first image array tiles are stored, e.g., in external RAM, for later use as a texture, as shown at block 515. The image array tiles are stored in compressed form. Later, during real-time rendering of a second image array, tiles from the stored, compressed image array may be retrieved for use as a texture, as shown at block 520. The second image array may be intended for display as a completed frame, and may employ the earlier rendered image as a texture. For example, the second image may include a reflection of all or part of the earlier rendered image. In any case, the compressed image array tiles are decompressed at block 525. Because the compressed image array was created and stored using a conventional buffer compression algorithm, the decompression at block 525 uses the corresponding buffer decompression algorithm, even though the retrieved image array tiles are intended for use as texture data.

At block 530, the decompressed image array tiles are thus applied as a texture map to one or more primitives in the second image array. Of course, the decompressed image array tiles may be only one of several textures used on different shapes in the second image array. Although this first texture data comes from an image array obtained from an earlier rendering operation, other textures used in the rendering of the second image array may be conventional pre-processed textures, which might be compressed according to a conventional texture compression algorithm or not compressed at all. The processing of one of these conventional textures is illustrated at blocks 535, 540, 545, where a portion of a stored texture file is retrieved, decompressed (using the texture decompression algorithm), and applied as a texture map in the second image array.

When completed (which may require numerous conventional processing operations that are not shown in FIG. 5), the second image array may finally be displayed, at block 550. The second image array data might, in some instances, be compressed again for use as a texture in the future, instead of or in addition to the displaying operation of block 550. This might be required, for example, in multi-pass rendering, where a buffer is repeatedly used as a texture. Several separate effects might be added to the buffer in two or more rendering passes.

Those skilled in the art will thus appreciate that the inventive graphics processors and corresponding methods disclosed herein allow the use of conventional texture files as well as rendered buffers as textures, with compression advantages gained in both cases. Those skilled in the art will also appreciate that FIG. 5 illustrates but one exemplary sequence of operations for processing three-dimensional graphics data in accordance with the present invention. Furthermore, the method of FIG. 5, as well as variants thereof, may be implemented on any of the graphics processors illustrated in FIGS. 2 to 4 and described above. Thus, rendering the first image array may comprise storing image array tiles in a unified cache memory during the rendering process, when, for example, a unified cache memory is configured between the graphics rendering engine and the compression unit, as shown in FIG. 2. The image array tiles may be retrieved from one or more of several different buffers, including, but not limited to, a color buffer, depth buffer, and stencil buffer. In this configuration, the decompression of the compressed image array tiles may likewise comprise storing the decompressed image array tiles in the unified cache memory, for use by the graphics rendering engine.

Similarly, other graphics processor implementations might include a unified cache memory between the compression unit and an external memory interface, such as is shown in FIG. 3. In this case, compressed image array tiles might be stored, for at least an interim period during and/or after compression, in the unified cache. Texture data, including tiles from rendered image arrays compressed and stored according to the present invention, may also be retrieved from external memory in compressed form, and held in the unified cache for processing by the compression unit.

Those skilled in the art will also appreciate that some mechanism may be required to allow the graphics processor to determine which compression algorithm was used to create a particular compressed texture. Thus, in some embodiments, the stored (compressed) texture file is associated with a compression algorithm identifier corresponding to the compression algorithm used to create it. Thus, rendered image array tiles compressed and stored for later use as texture data may be stored in association with a compression algorithm identifier indicating the real-time buffer compression algorithm used during the rendering and storing processes. This compression algorithm identifier may be analyzed when the stored, compressed image array tiles are later retrieved for use as texture data, to determine which buffer decompression algorithm should be used. In some embodiments, the compression algorithm identifier may be associated with the stored file by including it in header information included in the file itself. In other embodiments, the compression algorithm identifier may be maintained in a look-up table, with entries corresponding, for instance, to each of several saved files or to various file locations.

Finally, those skilled in the art will appreciate that the various graphics processors disclosed herein, such as graphics processors 200, 300, and 400, may each be implemented as a dedicated graphics rendering device for a personal computer, workstation, game console, mobile phone, or the like, or may be a general purpose processing system programmed to performed graphics processing operations. The graphics processors may comprise one or more microprocessors, microcontrollers, digital signal processors, and/or customized hardware, and may be implemented as a stand-alone chip or as part of an application-specific integrated circuit (ASIC) that includes other functions. In many embodiments, the graphics processors disclosed herein may comprise on-board random access memory and/or one or more cache memories.

The graphics processors disclosed herein may comprise one or more programmable elements, programmed using software, firmware, or some combination of the two. The graphics processors may also include one or more elements that are hardwired to carry out one or more of the methods described herein. In particular, the controller 205 illustrated in FIGS. 2, 3, and 4 may include a programmable element programmed with a device driver configured to control the various other elements of the graphics processor to carry out one or more of the methods described herein. Thus, an exemplary graphics processor may include a programmable controller, wherein a device driver executing on the programmable controller is configured to: update one or more tiles of a first image array, using a graphics rendering engine; compress the first image array tiles with a compression unit, using a real-time buffer compression algorithm, to obtain compressed image array tiles; and to store the compressed image array tiles for subsequent use as a texture. The device driver executing on the programmable controller may further control the graphics processor, during real-time rendering of a second image array, to: retrieve the compressed image array tiles; decompress the compressed image array tiles with the compression unit, using a decompression algorithm corresponding to the buffer compression algorithm; and apply the decompressed image array tiles as a texture map to at least a primitive in the second image array, using the graphics rendering engine.

A completed image array may be displayed, using conventional display driver hardware and software and conventional displays. In some embodiments, the display driver may be implemented using hardware closely associated with the graphics display. For example, many mobile phones already include a display processing block providing features such as scaling, overlay, color depth transformation, and the like. Color buffer decompression (and color space transformation, if needed) may be performed in such a display processing block. Alternatively, some or all of the functions of the display driver may be performed by the same circuit or circuits used to perform the graphics processor functions described herein.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of processing three-dimensional (3D) graphics data, comprising:
    updating one or more tiles of a first image array with graphics data;
    selecting a real-time compression algorithm from a pool of two or more available compression algorithms based on whether or not a current rendering operation is for subsequent use of the one or more tiles as a texture, wherein the compression rates of at least two of the available compression algorithms in the pool are different;
    compressing the one or more tiles, using the real-time compression algorithm, to obtain compressed image array tiles;
    storing the compressed image array tiles for subsequent use as the texture; and
    during real-time rendering of a second image array by a rendering engine:
        retrieving the compressed image array tiles;
        decompressing the compressed image array tiles using a decompression algorithm corresponding to the selected real-time compression algorithm; and
        applying the decompressed image array tiles as a texture map to at least a first primitive in the second image array.

2. The method of claim 1, wherein the first image array comprises a color buffer.

3. The method of claim 1, wherein the first image array comprises a depth buffer.

4. The method of claim 1, wherein the first image array comprises a stencil buffer.

5. The method of claim 1, wherein storing the compressed image array tiles for subsequent use as a texture comprises associating the compressed image array tiles with a compression algorithm identifier corresponding to the real-time compression algorithm, and wherein retrieving the compressed image array tiles comprises analyzing the compression algorithm identifier to identify the decompression algorithm to be used in decompressing the compressed image array tiles.

6. The method of claim 1, wherein updating the one or more tiles of the first image array comprises storing the one or more tiles in a unified cache memory during the updating, and wherein decompressing the compressed image array tiles comprises storing the decompressed image array tiles in the unified cache memory.

7. The method of claim 1, wherein storing the compressed image array tiles comprises storing the compressed image array tiles to a unified cache memory, and wherein retrieving the compressed image array tiles comprises retrieving the compressed image array tiles from the unified cache memory.

8. The method of claim 1, further comprising, during real-time rendering of the second image array:
    retrieving one or more texture tiles from a stored texture file, wherein the stored texture file is pre-compressed according to a texture compression algorithm;
    decompressing texture tiles using a texture decompression algorithm corresponding to the texture compression algorithm; and
    applying the decompressed texture tiles to at least a second primitive in the second image array.

9. The method of claim 8, wherein the stored texture file is associated with a compression algorithm identifier corresponding to the texture decompression algorithm.

10. The method of claim 8, further comprising displaying the second image array.

11. A graphics processor comprising graphics rendering engine circuitry, compression circuitry, and programmable processing circuitry configured to control the graphics rendering engine circuitry and the compression circuitry, wherein a device driver executing on the programmable processing circuitry is configured to:
    update one or more tiles of a first image array with graphics data, using the graphics rendering engine circuitry;
    select a real-time compression algorithm from a pool of two or more available compression algorithms based on whether or not a current rendering operation is for subsequent use of the one or more tiles as a texture, wherein the compression rates of at least two of the available compression algorithms in the pool are different;
    compress the one or more tiles with the compression circuitry, using the real-time compression algorithm, to obtain compressed image array tiles;
    store the compressed image array tiles for subsequent use as the texture; and
    during real-time rendering of a second image array by the graphics rendering engine circuitry:
        retrieve the compressed image array tiles;
        decompress the compressed image array tiles with the compression circuitry, using a decompression algorithm corresponding to the selected real-time compression algorithms; and
        apply the decompressed image array tiles as a texture map to at least a first primitive in the second image array, using the graphics rendering engine circuitry.

12. The graphics processor of claim 11, wherein the device driver executing on the programmable processing circuitry is configured to associate the stored compressed image array tiles with a compression algorithm identifier for use in identifying the decompression algorithm to be used during subsequent decompression of the compressed image array tiles.

13. The graphics processor of claim 11, further comprising a unified cache memory electrically coupled to the graphics rendering engine circuitry and the compression circuitry, wherein the graphics rendering engine circuitry is configured to store the one or more tiles of the first image array in the unified cache memory during the updating of the one or more tiles, and wherein the compression circuitry is configured to store the decompressed image array tiles in the unified cache memory after decompressing the compressed image array tiles.

14. The graphics processor of claim 11, further comprising a unified cache memory electrically coupled to the compression circuitry and an external memory interface, wherein the compression circuitry is configured to store the compressed image array tiles in the unified cache memory and to retrieve the compressed image array tiles from the unified cache memory.

15. The graphics processor of claim 11, wherein the compression circuitry is configured to compress and decompress image array tiles according to two or more compression algorithms.

16. The graphics processor of claim 11, wherein the device driver executing on the programmable processing circuitry is further configured to, during real-time rendering of the second image array:
- retrieve one or more texture tiles from a stored texture file, wherein the stored texture file is pre-compressed according to a texture compression algorithm;
- decompress the texture tiles with the compression circuitry, using a texture decompression algorithm corresponding to the texture compression algorithm; and
- apply the decompressed texture tiles to at least a second primitive in the second image array, using the graphics rendering engine circuitry.

17. The graphics processor of claim 16, wherein the device driver executing on the programmable processing circuitry is configured to analyze a compression algorithm identifier associated with the stored texture file to identify the texture decompression algorithm to be used in decompressing the texture tiles.

* * * * *